United States Patent
Takeshima et al.

(10) Patent No.: US 12,009,711 B2
(45) Date of Patent: Jun. 11, 2024

(54) METHOD OF MANUFACTURING MAGNETS AND METHOD OF MANUFACTURING ROTOR

(71) Applicant: TOYOTA JIDOSHA KABUSHIKI KAISHA, Toyota (JP)

(72) Inventors: Kenta Takeshima, Okazaki (JP); Takashi Yamamoto, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 349 days.

(21) Appl. No.: 17/686,836

(22) Filed: Mar. 4, 2022

(65) Prior Publication Data

US 2022/0302804 A1 Sep. 22, 2022

(30) Foreign Application Priority Data

Mar. 16, 2021 (JP) .............................. 2021-042276
Jan. 18, 2022 (JP) .............................. 2022-005604

(51) Int. Cl.
*H02K 15/03* (2006.01)
*B29C 65/00* (2006.01)
*B29C 65/44* (2006.01)

(52) U.S. Cl.
CPC ............. *H02K 15/03* (2013.01); *B29C 65/44* (2013.01); *B29C 66/721* (2013.01)

(58) Field of Classification Search
CPC ..... H01F 41/0253; H02K 15/03; B29C 66/71; B29C 66/721; B29C 66/7212; B29C 66/73921

USPC .......................................................... 156/250
See application file for complete search history.

(56) References Cited

U.S. PATENT DOCUMENTS

| 2016/0049851 | A1  | 2/2016 | Hasegawa et al. |
| 2022/0024141 | A1  | 1/2022 | Takeshima |
| 2022/0103029 | A1* | 3/2022 | Kameda .................. H02K 1/28 |

FOREIGN PATENT DOCUMENTS

| JP | 2013-123336 A | 6/2013 |
| JP | 5967297 B2    | 8/2016 |
| JP | 2022-023535 A | 2/2022 |

* cited by examiner

*Primary Examiner* — James D Sells
(74) *Attorney, Agent, or Firm* — Finnegan, Henderson, Farabow, Garret & Dunner, LLP (57) ABSTRACT

A method of manufacturing magnets and a method of manufacturing a rotor are provided. An intermediate member includes a sheet and magnet bodies. The sheet includes a first sheet surface and a second sheet surface on a side opposite to the first sheet surface. The magnet bodies are located on the first sheet surface. A first die is made of an elastic material having an elastic coefficient lower than the elastic coefficient of the magnet bodies. The intermediate member is arranged between the first die and a second die such that the second sheet surface of the sheet faces the first die. The first die and the second die hold the intermediate member in between. Accordingly, the sheet is cut at positions between adjacent ones of the magnet bodies.

5 Claims, 6 Drawing Sheets

METHOD OF MANUFACTURING MAGNETS AND METHOD OF MANUFACTURING ROTOR

BACKGROUND

1. Field

The present discloser relates to a method of manufacturing magnets and a method of manufacturing a rotor.

2. Description of Related Art

Japanese Patent No. 5967297 discloses a rotor of a motor, and the rotor includes a rotor core and magnets. The rotor core has slots. The magnets are located in the slots, respectively.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of manufacturing magnets is provided. The method includes: producing an intermediate member that includes a sheet and magnet bodies, the sheet including a first sheet surface and a second sheet surface on a side opposite to first sheet surface, and the magnet bodies being located on the first sheet surface; arranging the intermediate member between a first die and a second die, the first die being made of an elastic material having an elastic coefficient smaller than an elastic coefficient of the magnet bodies, the second die facing the first die, and the intermediate member being arranged between the first die and the second die such that the second sheet surface of the sheet faces the first die; and cutting the sheet at positions between adjacent ones of the magnet bodies by holding the intermediate member between the first die and the second die.

With this configuration, when cutting the sheet, the first die is elastically deformed in the lateral direction with respect to the magnet bodies. Further, the first die is elastically deformed so as to enter the gap between adjacent ones of the magnet bodies. As a result, the adjacent ones of the magnet bodies receive a force that moves the magnet bodies away from each other. Also, edges of each magnet body are likely to receive the force from the first die, which is elastically deformed, in a concentrated manner. Accordingly, the sheet is cut at positions, each of which is between adjacent ones of the magnet bodies. The cutting of the sheet occurs at multiple locations, each of which is between adjacent ones of the magnet bodies. The sheet is thus cut efficiently.

Some rotors are provided with magnets that include a magnet body and a sheet piece for coating adhered to the surface of the magnet body.

In this case, it requires time and effort to cut a sheet that is the material for coating into separate pieces in correspondence with the shape of each magnet body. Thus, there is a demand for a technique that cuts a sheet for covering surfaces of magnet bodies in an efficient manner. The above-described aspect contributes to such technique.

In the above-described method of manufacturing the magnets, the magnet bodies may each include a flat first magnet surface and a flat second magnet surface. The second magnet surface may be adjacent to the first magnet surface. The producing the intermediate member may include arranging the magnet bodies on the first sheet surface of the sheet such that the first magnet surface contacts the sheet.

With this configuration, when the first die is pressed against the intermediate member, force is readily applied to the boundary between the first magnet surface and the second magnet surface of each magnet body. Thus, the sheet is easily cut at the boundary.

In the above-described method of manufacturing the magnets, a surface of the first die that faces the sheet may include a flat surface and a protruding surface that protrudes from the flat surface. The arranging the intermediate member between the first die and the second die may include arranging the intermediate member such that a boundary between the first magnet surface and the second magnet surface of each magnet body and the protruding surface face each other with the sheet in between.

With this configuration, when the first die is pressed against the intermediate member, force is readily applied to the sheet from the protruding surface of the first die. Specifically, a significantly great force is applied to a section of the sheet that is held between the protruding surface of the first die and the boundary between the first magnet surface and the second magnet surface of each magnet body. The sheet is reliably cut in the section of the sheet held between the protruding surface and the boundary of each magnet body.

In the method of manufacturing magnets, the sheet material includes thermoplastic resin fiber and inorganic fiber. The intermediate member may be produced by compressing the sheet while heating the sheet to a temperature higher than or equal to the glass transition temperature of the thermoplastic resin fiber, thereby thermocompression-bonding the sheet to the magnet bodies in a state in which the inorganic fiber is elastically compressed.

The sheet, which includes the thermoplastic resin fiber and the inorganic fiber, is thermocompression-bonded to the magnet bodies. Thereafter, the sheet and the magnet bodies are reheated, so that the thermoplastic resin fiber in the sheet is softened again. Then, the inorganic fiber, which has been elastically compressed, restores its original state, causing the sheet to expand. In order to utilize such expanding property of the sheet, the magnets, in which a sheet piece that is generated by cutting the sheet is thermocompression-bonded to the magnet bodies, are placed in the slots of the rotor core. The magnets in the slots are heated to expand the sheet piece, so that the magnets are fixed in the rotor core.

With this configuration, the production of the intermediate member includes thermocompression-bonding the sheet to the magnet bodies. Thus, by cutting the sheet, the magnets, in which the sheet piece is thermocompression-bonded to the magnet bodies, are produced. These magnets are placed in the slots of the rotor core. The magnets are fixed to the rotor core by simply heating the magnets in the slots. In this manner, the above-described configuration manufactures the rotor highly efficiently.

In another general aspect, a method of manufacturing a rotor is provided. The method includes: producing an intermediate member, the intermediate member including a sheet and magnet bodies, the sheet including a first sheet surface and a second sheet surface on a side opposite to first sheet surface, the sheet including a thermoplastic resin fiber and an inorganic fiber, the producing the intermediate member including compressing, in a state in which the magnet bodies are located on the first sheet surface of the sheet, the sheet while heating the sheet to a temperature higher than or equal to a glass transition temperature of the thermoplastic resin fiber, thereby thermocompression-bonding the sheet to the magnet bodies with the inorganic fiber being elastically compressed; arranging the intermediate member between a first die and a second die, the first die being made of an elastic material having an elastic coefficient smaller than an elastic coefficient of the magnet bodies, the second die facing the first die, and the intermediate member being arranged between the first die and the second die such that the second sheet surface of the sheet faces the first die; cutting the sheet at positions between adjacent ones of the magnet bodies by holding the intermediate member between the first die and the second die in order to produce magnets, the magnets each including one of the magnet bodies and a sheet piece that is generated by cutting the sheet and covers one of the magnet bodies; and fixing the magnets to the rotor core by heating the magnets to a temperature higher than or equal to the glass transition temperature in a state in which the magnets are arranged inside slots in the rotor core, wherein the heating the magnets to the temperature higher than or equal to the glass transition temperature causes the inorganic fiber to restore its original state by its elasticity so that the magnets are fixed to the rotor core.

The sheet, which includes the thermoplastic resin fiber and the inorganic fiber, is thermocompression-bonded to the magnet bodies. Then, these are reheated. This softens the thermoplastic resin fiber in the sheet, so that the inorganic fiber, which has been elastically compressed, restores its original state. Accordingly, the sheet expands. With this configuration, this property is utilized to expand the sheet piece, which is thermocompression-bonded to the magnet bodies, in the slots of the rotor core, thereby fixing the magnets to the rotor core. In this manner, when fixing the magnets to the rotor core, the above-described configuration produces in advance the intermediate member, in which the sheet is thermocompression-bonded to the magnet bodies. The intermediate member is then held between the first die and the second die, so that the intermediate member is cut at sections, each of which is between adjacent ones of the magnet bodies. When the intermediate member is held between the first die and the second die, so that the first die is pressed against the intermediate member, the first die is elastically deformed to extend in the lateral direction and is also elastically deformed to enter the gap between adjacent ones of the magnet bodies. As a result, the adjacent ones of the magnet bodies receive a force that move the magnet bodies away from each other. Also, edges of each magnet body are likely to receive the force from the first die, which is elastically deformed, in a concentrated manner. Accordingly, the sheet is cut at positions between adjacent ones of the magnet bodies. The cutting of the sheet occurs at multiple locations each between adjacent ones of the magnet bodies in the cutting step. The sheet is thus cut efficiently.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A method of manufacturing magnets and a method of manufacturing a rotor according to one embodiment will now be described with reference to FIGS. 1 to 10.

<Overall Configuration of Motor>

First, a schematic configuration of a motor 50 will be described.

Figure 1:
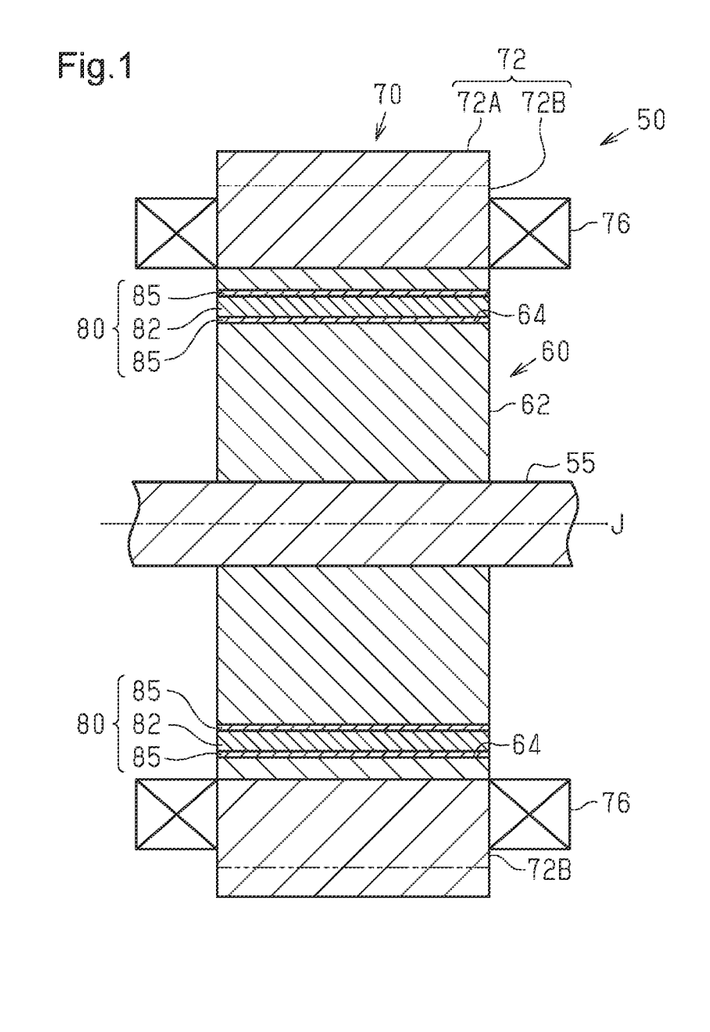
FIG. 1 is a cross-sectional view showing a motor including a rotor that is manufactured by a manufacturing method according to the present disclosure.

As shown in FIG. 1, the motor 50 includes a stator 70, a rotor 60, and a shaft 55.

The stator 70 has a cylindrical shape as a whole. The stator 70 includes a stator core 72 and coils 76. The stator core 72 includes a body (hereinafter, referred to as a stator core body) 72A and teeth 72B. The stator core body 72A is cylindrical. The teeth 72B project from the inner circumferential surface of the stator core body 72A toward a central axis J of the stator core body 72A. The teeth 72B are arranged at equal intervals in the circumferential direction. In FIG. 1, the boundaries between the stator core body 72A and the teeth 72B are indicated by long-dash double-short-dash lines.

The coils 76 are wound around the respective teeth 72B. In the direction of the central axis J of the stator core body 72A, each coil 76 reaches positions outward of the opposite ends of the stator core body 72A. That is, each coil 76 projects from the stator core 72 in the direction along the central axis J of the stator core body 72A. In the present description, any line that coincides with the central axis J of the stator core body 72A is also represented by the symbol J. For example, the central axis of the rotor 60 is represented by the symbol J.

The rotor 60 is cylindrical. The rotor 60 is located on the inner side of the stator core body 72A. The central axis J of the rotor 60 agrees with the central axis J of the stator core body 72A. A gap exists between the outer circumferential surface of the rotor 60 and a projecting end, that is, the inner end in the radial direction, of each tooth 72B of the stator 70. These gaps are not illustrated in FIG. 1. The details of the rotor 60 will be discussed below. The rotor 60 is rotatable relative to the stator 70.

The shaft 55 is columnar. The shaft 55 extends through a hole at the center of the rotor 60. The central axis J of the shaft 55 agrees with the central axis J of the rotor 60. The shaft 55 rotates integrally with the rotor 60.

<Configuration of Rotor>

The rotor 60 will now be described. The rotor 60 includes a rotor core 62 and magnets 80. The rotor core 62 is cylindrical. Although not illustrated, the rotor core 62 is formed by stacking magnetic steel sheets, which are formed to have a circular annular shape, in the direction of the central axis J.

Figure 2:
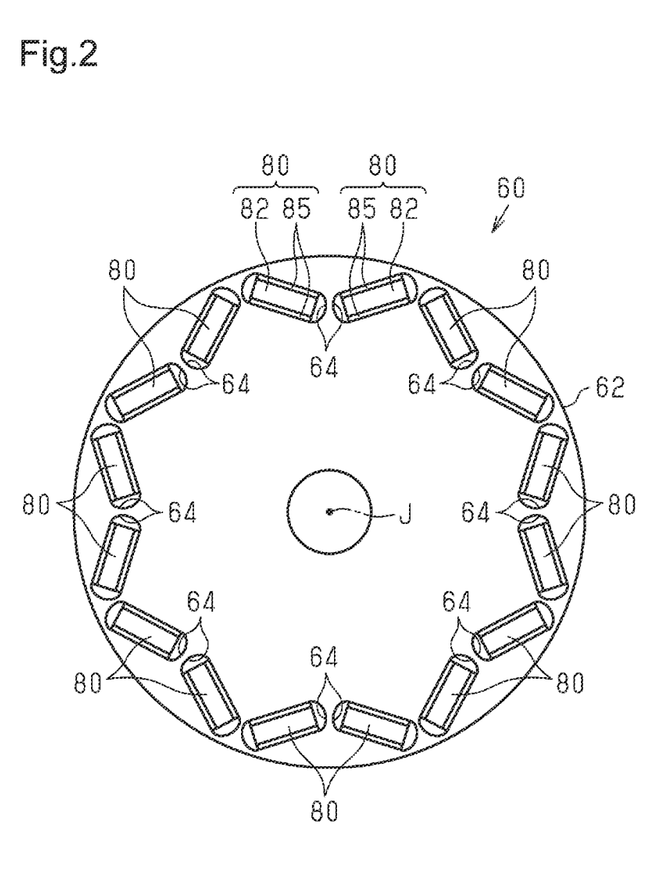
FIG. 2 is a plan view of the rotor shown in FIG. 1.

The rotor core 62 has slots 64. The slots 64 are through-holes that extend through the rotor core 62 in the direction along the central axis J of the rotor core 62. As shown in FIG. 2, the slots 64 are located close to the outer circumference, that is, in the vicinity of the outer circumferential surface, of the rotor core 62. The slots 64 are arranged in the circumferential direction of the rotor core 62.

As shown in FIG. 2, the slots 64 are substantially rectangular in plan view in the direction along the central axis J of the rotor core 62. When two of the slots 64 that are adjacent to each other in the circumferential direction of the rotor core 62 are regarded as a pair, eight pairs of slots 64 are provided. The two slots 64 of each pair are arranged to form the letter V in plan view in the direction along the central axis J of the rotor core 62. Specifically, the two slots 64 in each pair are arranged to be closer to each other toward the center of the rotor core 62.

The magnets 80 are located in the slots 64, respectively. That is, one magnet 80 is provided for each slot 64. Each magnet 80 includes a body (hereinafter, referred to as magnet body) 82 and two sheet pieces 85.

Figure 3:
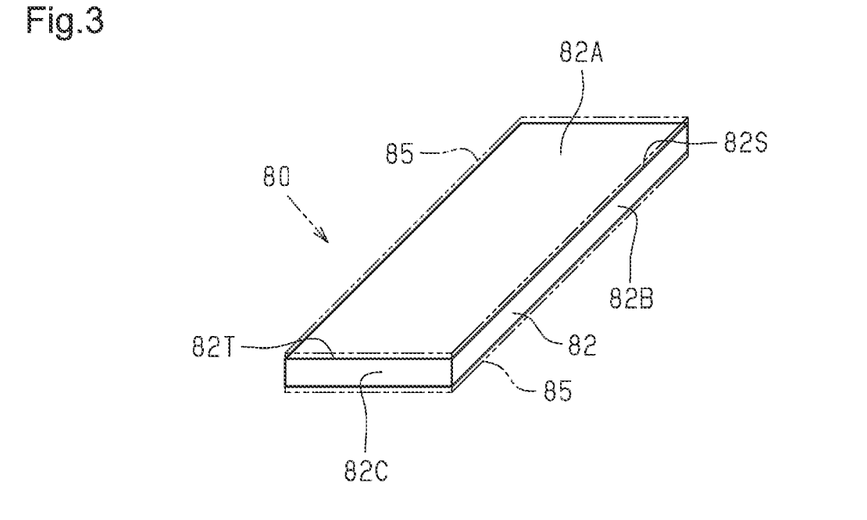
FIG. 3 is a perspective view of a magnet shown in FIGS. 1 and 2.

The magnet body 82 is made of a permanent magnet. In the present embodiment, the magnet body 82 is a neodymium magnet, which is made of materials including iron, neodymium, and boron. As shown in FIG. 3, the magnet body 82 has the shape of a rectangular plate. Specifically, the magnet body 82 includes two first magnet surfaces 82A, two second magnet surfaces 82B, and two third magnet surfaces 82C. The first magnet surfaces 82A are surfaces of the largest areas in the outer surfaces of the magnet body 82. The first magnet surfaces 82A are rectangular. The first magnet surfaces 82A are flat and not curved. The two first magnet surfaces 82A are in a parallel positional relationship. The second magnet surfaces 82B each connect the long sides of the rectangular shapes of the two first magnet surfaces 82A to each other. That is, the second magnet surfaces 82B and the first magnet surfaces 82A are adjacent to each other. The second magnet surfaces 82B are flat and not curved. The first magnet surfaces 82A and the second magnet surfaces 82B are substantially orthogonal to each other. That is, boundaries 82S between the first magnet surfaces 82A and the second magnet surfaces 82B are angular. The third magnet surfaces 82C each connect the short sides of the rectangular shapes of the two first magnet surfaces 82A to each other. That is, the third magnet surfaces 82C and the first magnet surfaces 82A are adjacent to each other. The third magnet surfaces 82C are flat and not curved. The first magnet surfaces 82A and the third magnet surfaces 82C are substantially orthogonal to each other. That is, boundaries 82T between the first magnet surfaces 82A and the third magnet surfaces 82C are angular.

The sheet pieces 85 are nonwoven fabric sheets made of polyetherimide fiber, which is thermoplastic resin fiber, and glass fiber, which is inorganic fiber. Two sheet pieces 85 respectively cover the two first magnet surfaces 82A of the magnet bodies 82. The two sheet pieces 85 form insulating layers. In the drawings, the thickness of each sheet piece 85 is exaggerated.

The shape and dimensions of each magnet 80 are generally the same as the shape and dimensions of each slot 64. With reference to FIG. 2, in plan view in the direction along the central axis J of the rotor core 62, a direction along the short sides of each slot 64, which has a rectangular shape, is defined as a width direction of the slot 64. With reference to FIG. 1, in a state in which the magnets 80 are fixed to the slots 64, the two sheet pieces 85 of each magnet 80 are in contact with the inner surface of the associated slot 64 on the opposite sides in the width direction. In the direction along the central axis J of the rotor core 62, the opposite ends of each magnet 80 agree with the opposite ends of the associated slot 64. With reference to FIG. 2, in plan view in a direction along the central axis J of the rotor core 62, gaps exist between each magnet 80 and the inner surfaces of the associated slot 64 on the opposite sides in the longitudinal direction. The inner surfaces of each slot 64 on the opposite sides in the longitudinal direction are depicted as having arcuate shapes in FIG. 2.

The two magnets 80 arranged in each pair of the slots 64, as shown in FIG. 2, form one of the magnetic poles of the motor 50. That is, the slots 64 of each pair respectively accommodate two magnets 80, and the outer surfaces of the magnets 80 in the radial direction of the rotor 60 are magnetized to have the same polarity. Each pair of the magnets 80 form a magnetic pole, which is a north pole or a south pole. The polarity of each pair of the magnets 80 is opposite to that of the magnets 80 in the adjacent pairs. As a result, north poles and south poles are arranged alternately in the circumferential direction of the rotor 60.

<Intermediate Member Manufacturing Apparatus>

An intermediate member manufacturing apparatus 200, which is used to produce the magnets 80, will now be described. The following description will be given using, as reference, the upper side and the lower side as viewed in the drawings. However, the upper side and the lower side in the drawings do not necessarily agree with the actual upper and lower sides of the apparatus.

Figure 6:
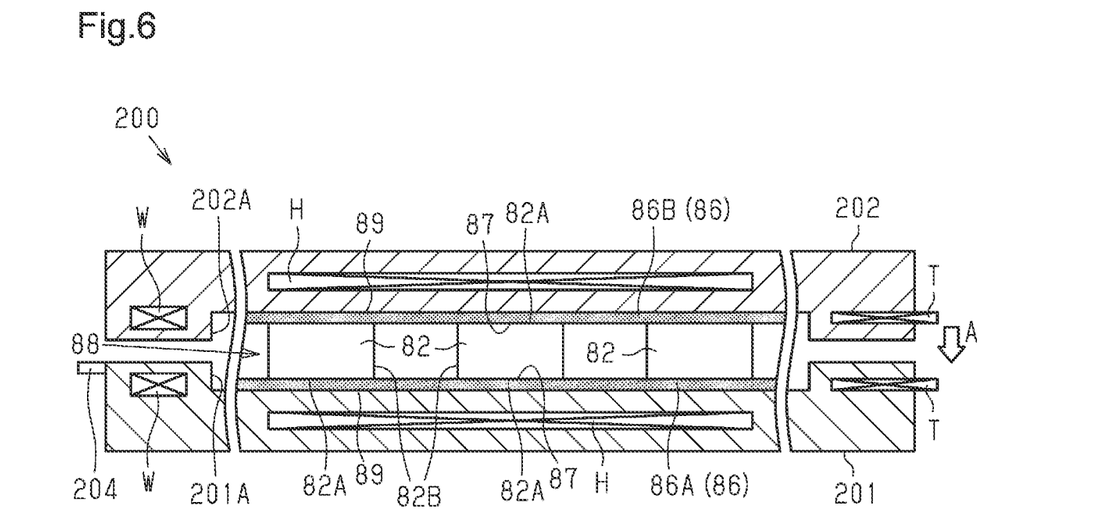
FIG. 6 is an explanatory diagram illustrating an intermediate member manufacturing apparatus used in the intermediate member producing step shown in FIG. 5.

As shown in FIG. 6, the intermediate member manufacturing apparatus 200 is a press die apparatus. The intermediate member manufacturing apparatus 200 includes a first compression die 201 and a second compression die 202. The first compression die 201 has a substantially rectangular parallelepiped shape. The first compression die 201 is made of copper. The reason why copper is used as the material of the first compression die 201 is that copper has a high thermal conductivity. The shape and the material of the second compression die 202 are the same as those of the first compression die 201. The second compression die 202 is located above the first compression die 201. An upper surface of the first compression die 201 and a lower surface of the second compression die 202 face each other. The second compression die 202 is driven by a servo motor so as to move toward or away from the first compression die 201.

The first compression die 201 includes a first recess 201A. The first recess 201A is recessed downward in the upper surface of the first compression die 201. When the first compression die 201 is viewed from above, the first recess 201A has a rectangular shape. When the first compression die 201 is viewed from above, the dimensions of the long sides and the short sides of the first recess 201A are greater than the dimensions of the long sides and the short sides of the sheet 86, which is prepared in a preparing step S10, which will be discussed below. The depth of the first recess 201A is less than half the thickness of the magnet body 82. The second compression die 202 includes a second recess 202A, which is similar to the first recess 201A of the first compression die 201. The second recess 202A is recessed upward in the lower surface of the second compression die 202.

The intermediate member manufacturing apparatus 200 includes two heaters H, two coolant passages W, two temperature sensors T, and a load sensor 204. One of the two heaters H is located inside the first compression die 201. The other heater H is located inside the second compression die 202. The heaters H are capable of respectively adjusting the temperatures of the first compression die 201 and the second compression die 202. One of the two coolant passages W is defined in the first compression die 201. The other coolant passage W is defined in the second compression die 202. Although not illustrated, a switching mechanism is provided outside the first compression die 201 and the second compression die 202 to selectively permit and prohibit flow of coolant to the coolant passages W. One of the two temperature sensors T detects the temperature of the first recess 201A of the first compression die 201. The other temperature sensor T detects the temperature of the second recess 202A of the second compression die 202. The temperature sensors T each include, for example, a thermocouple. The load sensor 204 detects the force acting on an object that is held between the first compression die 201 and the second compression die 202 when the second compression die 202 is brought closer to the first compression die 201. The load sensor 204 includes, for example, a load cell. For the illustrative purposes, the load sensor 204 is shown on a side surface of the first compression die 201 in FIG. 6.

<Cutting Device>

A cutting device 300 used to produce the above-described magnets 80 will now be described.

Figure 7:
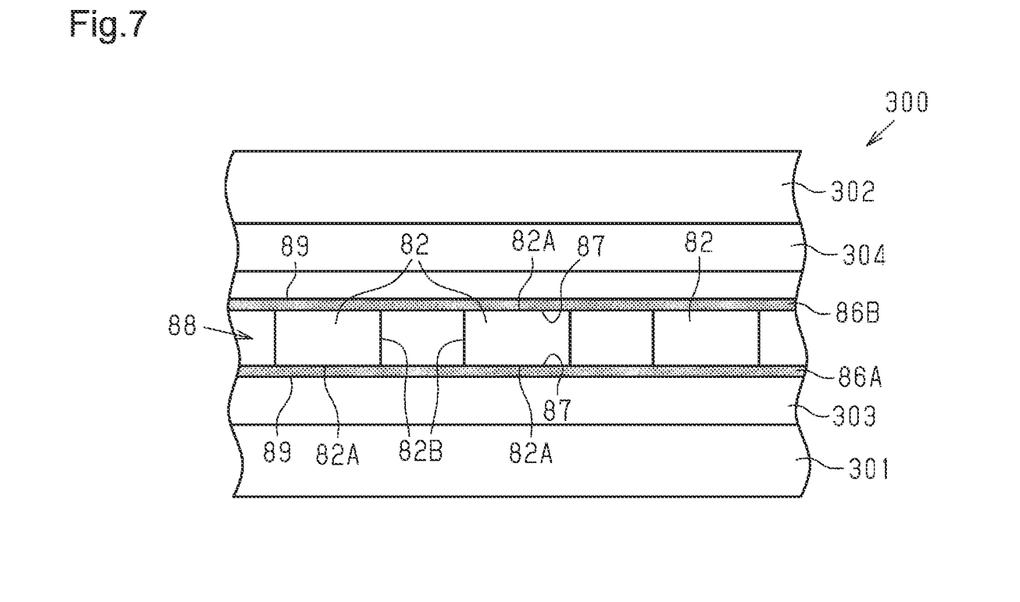
FIG. 7 is an explanatory diagram of an arranging step shown in FIG. 4.

As shown in FIG. 7, the cutting device 300 includes a first base member 301 and a second base member 302. The first base member 301 has a substantially rectangular parallelepiped shape. The first base member 301 is made of metal. The shape and the material of the second base member 302 are the same as those of the first base member 301. The second base member 302 is located above the first base member 301. The second base member 302 is driven by a servo motor so as to move toward or away from the first base member 301.

The cutting device 300 includes a first die 303 and a second die 304. The first die 303 has a substantially rectangular parallelepiped shape. The first die 303 is made of an elastic material. Specifically, the material of the first die 303 is a thermosetting elastomer, that is, rubber. The elastic coefficient of the first die 303 is lower than the elastic coefficient of the magnet bodies 82. The Shore hardness of the first die 303 is approximately 70 to 90 HS. Shore hardness is an index representing the hardness of an object. The greater the Shore hardness, the harder the object is. The shape, the material, the elastic coefficient, and the Shore hardness of the second die 304 are the same as those of the first die 303.

The first die 303 and the second die 304 are located between the first base member 301 and the second base member 302. Specifically, the first die 303 is located on the upper surface of the first base member 301. The first die 303 is fixed to the upper surface of the first base member 301. The second die 304 is located on the lower surface of the second base member 302. The second die 304 is fixed to the lower surface of the second base member 302. The lower surface of the second die 304 faces the upper surface of the first die 303. The lower surface of the second die 304 and the upper surface of the first die 303 are both flat and not curved. The second die 304 and the second base member 302 move integrally. That is, when the second base member 302 approaches or moves away from the first base member 301, the second die 304 approaches or moves away from the first die 303.

<Method of Manufacturing Magnets and Rotor>

Figure 4:
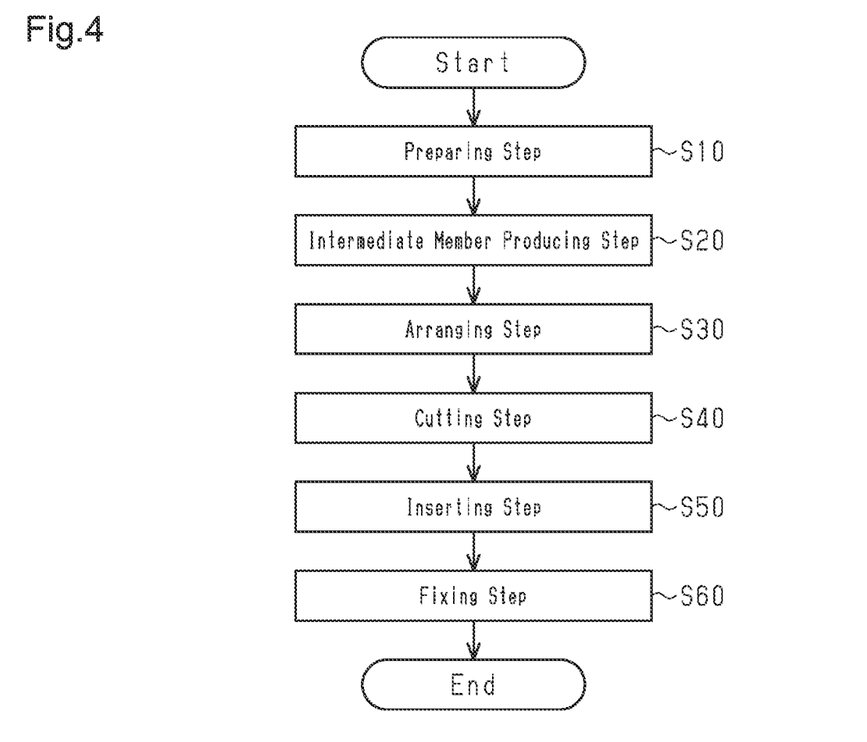
FIG. 4 is a flowchart showing steps for manufacturing the rotor shown in FIG. 2.

A method of manufacturing the magnets 80 and the rotor 60 will now be described. As shown in FIG. 4, the method of manufacturing the rotor 60 includes a preparing step S10, an intermediate member producing step S20, an arranging step S30, a cutting step S40, an inserting step S50, and a fixing step S60. Of these six steps, the preparing step S10 to the cutting step S40 produce the magnets 80. That is, the method of manufacturing the magnets 80 includes a process from the preparing step S10 to the cutting step S40.

Figure 5:
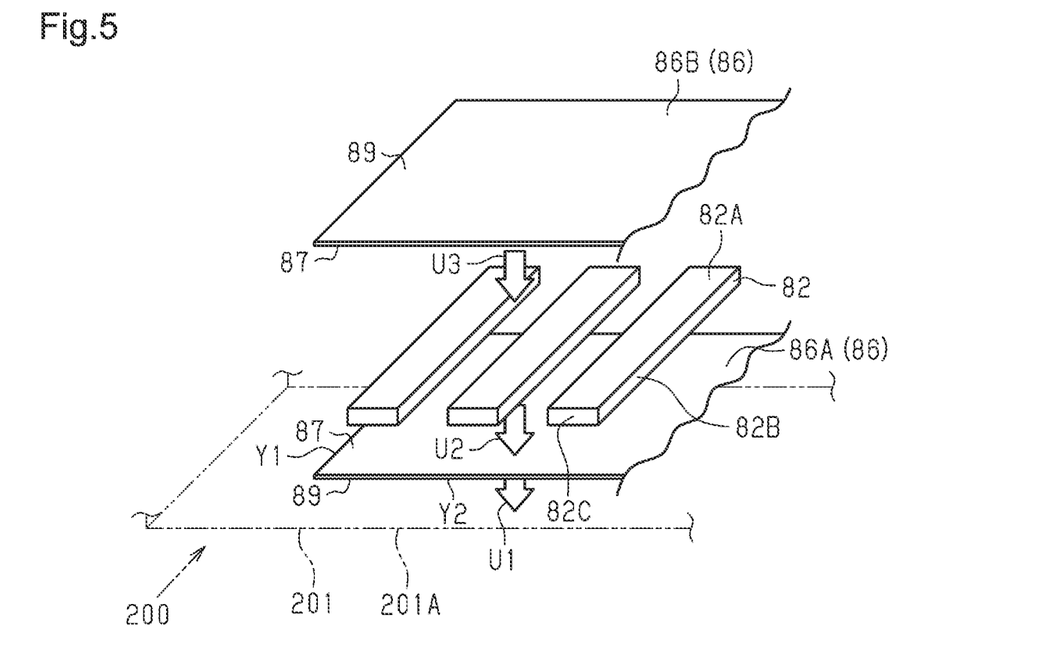
FIG. 5 is an explanatory diagram showing an intermediate member producing step shown in FIG. 4.

When manufacturing the rotor 60, the preparing step S10 is performed first. The preparing step S10 prepares the rotor core 62, the magnet bodies 82, and the sheets 86. The prepared rotor core 62 and magnet bodies 82 have the shapes as described above. The number of the prepared magnet bodies 82 agrees with the number of the slots 64 in the rotor core 62. That is, sixteen magnet bodies 82 are prepared per rotor core 62. In the present embodiment, the total number of the magnet bodies 82 in a single rotor core 62 is sixteen. Two sheets 86 are prepared for each rotor core 62. The sheets 86 are rectangular. Each sheet 86 is larger than the combined size of two or more of the sheet pieces 85. In the present embodiment, the size of one sheet 86 is larger than the combined size of all the sheet pieces 85 for a single rotor core 62. In other words, one sheet 86 is larger than the combined size of sixteen pieces 85. As shown in FIG. 5, the dimension of the short sides Y1 of each sheet 86 is longer than the dimension of the long sides of the first magnet surfaces 82A of each magnet body 82. The dimension of the long sides Y2 of each sheet 86 is longer than thirty-two times the dimension of the short sides of the first magnet surfaces 82A of each magnet body 82. Hereinbelow, when the two sheets 86 are described separately, the sheets 86 are referred to as a first sheet 86A and a second sheet 86B. When the first sheet 86A and the second sheet 86B are described collectively, these are referred to as the sheets 86.

<Intermediate Member Producing Step>

As shown in FIG. 4, the intermediate member producing step S20 is performed after the preparing step S10. The intermediate member producing step S20 utilizes the intermediate member manufacturing apparatus 200 to produce the intermediate member 88. At the time when the intermediate member producing step S20 is started, the second compression die 202 of the intermediate member manufacturing apparatus 200 is stopped at an initial position. The initial position of the second compression die 202 is significantly far from the first compression die 201.

First, in the intermediate member producing step S20, the first sheet 86A is placed in the first recess 201A of the first compression die 201 in the intermediate member manufacturing apparatus 200 as indicated by arrow U1 in FIG. 5, for example, by a robotic arm. Then, sixteen magnet bodies 82 are arranged on the first sheet 86A as indicated by arrow U2 in FIG. 5. The magnet bodies 82 are arranged on the first sheet 86A such that the first magnet surfaces 82A of each magnet body 82 faces the first sheet 86A. Also, the long sides of the first magnet surfaces 82A of each magnet body 82 are made parallel with the short sides Y1 of the first sheet 86A. In this case, the second magnet surfaces 82B of adjacent ones of the magnet bodies 82 face each other. In this manner, the sixteen magnet bodies 82 are arranged in a row at intervals. The clearance between adjacent ones of the magnet bodies 82 is shorter than the dimension of the short sides of the first magnet surfaces 82A of the magnet bodies 82. Thereafter, the second sheet 86B is placed on the sixteen magnet bodies 82 as indicated by arrow U3 in FIG. 5. At this time, the four sides of the second sheet 86B are aligned with the four sides of the first sheet 86A. Then, the two sheets 86 cover the upper and lower first magnet surfaces 82A of the respective magnet bodies 82. In plan view from above, the second sheet 86B spreads beyond the edges of the sixteen magnet bodies 82. The first sheet 86A also spreads beyond the edges of the sixteen magnet bodies 82. Specifically, the first sheet 86A includes a first sheet surface 87 and a second sheet surface 89, which is on a side opposite to the first sheet surface 87. The second sheet 86B includes a first sheet surface 87 and a second sheet surface 89, which is on a side opposite to the first sheet surface 87. The magnet bodies 82 are arranged on the first sheet surface 87 of the first sheet 86A such that the first magnet surfaces 82A contact the first sheet 86A. The second sheet surface 89 of the first sheet 86A faces the first compression die 201. The magnet bodies 82 are arranged on the first sheet surface 87 of the second sheet 86B such that the first magnet surfaces 82A contact the second sheet 86B. The second sheet surface 89 of the second sheet 86B faces the second compression die 202.

Thereafter, the intermediate member manufacturing apparatus 200 is driven. As indicated by arrow A in FIG. 6, the second compression die 202 approaches the first compression die 201. The bottom surface of the first recess 201A of the first compression die 201 and the bottom surface of the second recess 202A of the second compression die 202 hold the two sheets 86 and the sixteen magnet bodies 82 in between. At this time, the first sheet 86A is held between the bottom surface of the first recess 201A and the first magnet surfaces 82A of the respective the magnet bodies 82. Likewise, the second sheet 86B is held between the bottom surface of the second recess 202A and the first magnet surfaces 82A of the respective the magnet bodies 82. The operation of the second compression die 202 is stopped at a position where the force acting on the two sheets 86 is a specified load N. The force acting on the two sheets 86 is obtained from the value detected by the load sensor 204. The specified load N has been determined, for example, through experiments in advance as a value that is greater than or equal to the minimum load required to elastically compress the glass fiber in the sheets 86, and less than the minimum load that breaks the glass fiber. In order to clearly show the two sheets 86, the first sheet 86A and the second sheet 86B are depicted with dots in FIG. 6.

Thereafter, the heaters H are used to heat the first compression die 201 and the second compression die 202. Also, the temperature of the first recess 201A of the first compression die 201 is regulated to a first specified temperature Z1. Also, the temperature of the second recess 202A of the second compression die 202 is regulated to the first specified temperature Z1. The temperatures of the first recess 201A and the second recess 202A are obtained from the values detected by the temperature sensors T. The first specified temperature Z1 has been determined in advance to be higher than or equal to the glass transition temperature of polyetherimide, which forms the sheets 86, and lower than the temperature at which polyetherimide evaporates. In the present embodiment, the first specified temperature Z1 is set to be slightly higher than the glass transition temperature of polyetherimide.

The two sheets 86 are compressed while being heated as described above for a first specified time L1. The first specified time L1 has been determined, for example, through experiments as an amount of time required for polyetherimide to be softened to such an extent that the glass fiber in the sheets 86 is elastically compressed in a state in which the sheets 86 are at the first specified temperature Z1.

When the first specified time L1 has elapsed, the temperatures of the first compression die 201 and the second compression die 202 are lowered while maintaining the compressed state of the two sheets 86. For example, the temperature of the heaters H is lowered or coolant is supplied to the coolant passages W. Further, the temperature of the first recess 201A of the first compression die 201 is regulated to a second specified temperature Z2. Also, the temperature of the second recess 202A of the second compression die 202 is regulated to the second specified temperature Z2. The second specified temperature Z2 is set to be lower than the glass transition temperature of polyetherimide. In the present embodiment, the second specified temperature Z2 is slightly lower than the glass transition temperature of polyetherimide.

The first recess 201A of the first compression die 201 and the second recess 202A of the second compression die 202 are maintained at the second specified temperature Z2 for a second specified time L2 while the two sheets 86 keep being compressed. The second specified time L2 has been determined, for example, through experiments in advance as an amount of time required for polyetherimide in the sheets 86 to be solidified in a state in which the sheets 86 are at the second specified temperature Z2.

When the second specified time L2 has elapsed, the second compression die 202 is returned to the initial position. Then, an intermediate member 88 exists in the first recess 201A of the first compression die 201. The intermediate member 88 includes the sheets 86, which have been thermocompression-bonded to the upper and lower first magnet surfaces 82A of the respective magnet bodies 82. At this time, the inorganic fiber in the sheets 86 is elastically compressed. The above-described series of processes performed by the intermediate member manufacturing apparatus 200 is the intermediate member producing step S20. As described above, the intermediate member 88 includes the magnet bodies 82, of which the two first magnet surfaces 82A are covered with the sheets 86. In other words, in the intermediate member 88, one of the two first magnet surfaces 82A of each magnet body 82 is located on the same surface of the first sheet 86A, and the other first magnet surface 82A of each magnet body 82 is located on the same surface of the second sheet 86B. That is, the magnet bodies 82 are located on the first sheet surface 87 of the first sheet 86A, but are not located on the second sheet surface 89 of the first sheet 86A. The magnet bodies 82 are located on the first sheet surface 87 of the second sheet 86B, but are not located on the second sheet surface 89 of the second sheet 86B.

<Arranging Step>

As shown in FIG. 4, the arranging step S30 is performed after the intermediate member producing step S20. The arranging step S30 arranges the intermediate member 88 in the cutting device 300. At the time when the arranging step S30 is started, the second base member 302 and the second die 304 of the cutting device 300 are stopped at the initial position. The initial position of the second die 304 is significantly far from the first die 303. In this state, the intermediate member 88 is placed on the upper surface of the first die 303, for example by a robotic arm, as shown in FIG. 7. At this time, the first sheet 86A is caused to face the upper surface of the first die 303. That is, the upper surface of the first die 303 faces the second sheet surface 89 of the first sheet 86A. The second sheet surface 89 is on the side opposite to the first sheet surface 87, on which the first magnet surfaces 82A of the magnet bodies 82 are placed. Also, the lower surface of the second die 304 faces the second sheet surface 89 of the second sheet 86B. The second sheet surface 89 is on the side opposite to the first sheet surface 87, on which the first magnet surfaces 82A of the magnet bodies 82 are placed. That is, the intermediate member 88 is arranged between the first die 303 and the second die 304 such that the second sheet surface 89 of the first sheet 86A faces the first die 303, and the second sheet surface 89 of the second sheet 86B faces the second die 304. As in the case of FIG. 6, the first sheet 86A and the second sheet 86B are depicted with dots in FIG. 7.

<Cutting Step>

As shown in FIG. 4, the cutting step S40 is performed after the arranging step S30. The cutting step S40 cuts the two sheets 86 in the intermediate member 88. The cutting device 300 is driven in the cutting step S40. Then, as indicated by arrow B in FIG. 8, the second die 304 approaches the first die 303 together with the second base member 302. The first die 303 and the second die 304 hold the intermediate member 88 in between. When the second die 304 is moved to a predetermined proximity position Q, the operation of the second base member 302 and the second die 304 is stopped. In this state, the cutting device 300 stands by for a standby time M. The standby time M is, for example, five seconds. During the standby time M, the two sheets 86 are cut in correspondence with the respective magnet bodies 82. That is, the two sheets 86 are cut at locations between adjacent ones of the magnet bodies 82 or cut along the long sides or the short sides of the first magnet surfaces 82A of the magnet bodies 82. Thus, cutting each sheet 86 generates, from the sheet 86, sheet pieces 85 the number of which corresponds to the number of the magnet bodies 82. The mechanism by which the sheets 86 are cut will be described in the operation section below. The proximity position Q has been determined, for example, through experiments in advance as a position of the second die 304 where force required to cut the sheets 86 is applied to the intermediate member 88. Also, the standby time M has been determined, for example, through experiments in advance as an amount of time required for cutting of the sheets 86 to be completed in a state in which the second die 304 is stopped at the proximity position Q. As in the case of FIG. 7, the first sheet 86A, the second sheet 86B, and the sheet piece 85 are depicted with dots in FIG. 8.

Figure 8:
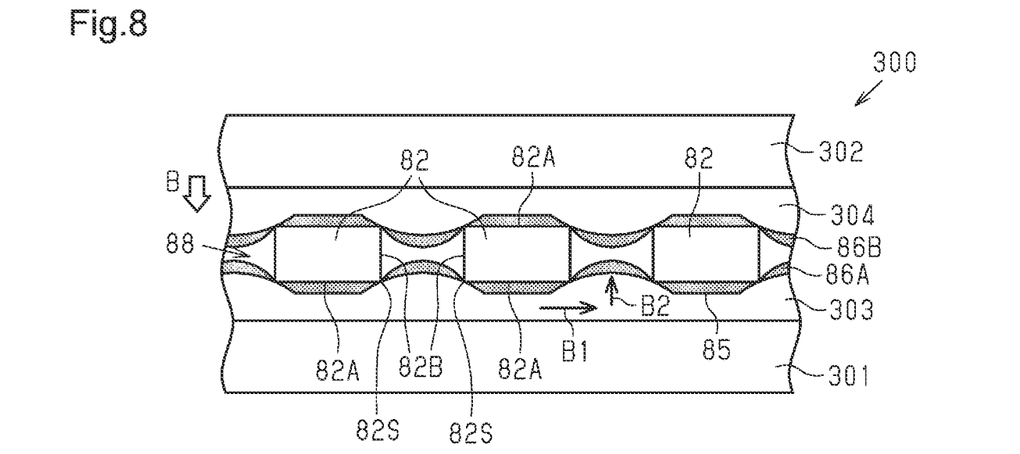
FIG. 8 is an explanatory diagram of a cutting step shown in FIG. 4.

Thereafter, the second die 304 is returned to the initial position together with the second base member 302. Then, the sixteen magnets 80 and scraps of the sheets 86 remain on the supper surface of the first die 303. Each magnet 80 includes a magnet body 82 and sheet pieces 85 that cover the two first magnet surfaces 82A of the magnet body 82.

<Inserting Step>

Figure 9:
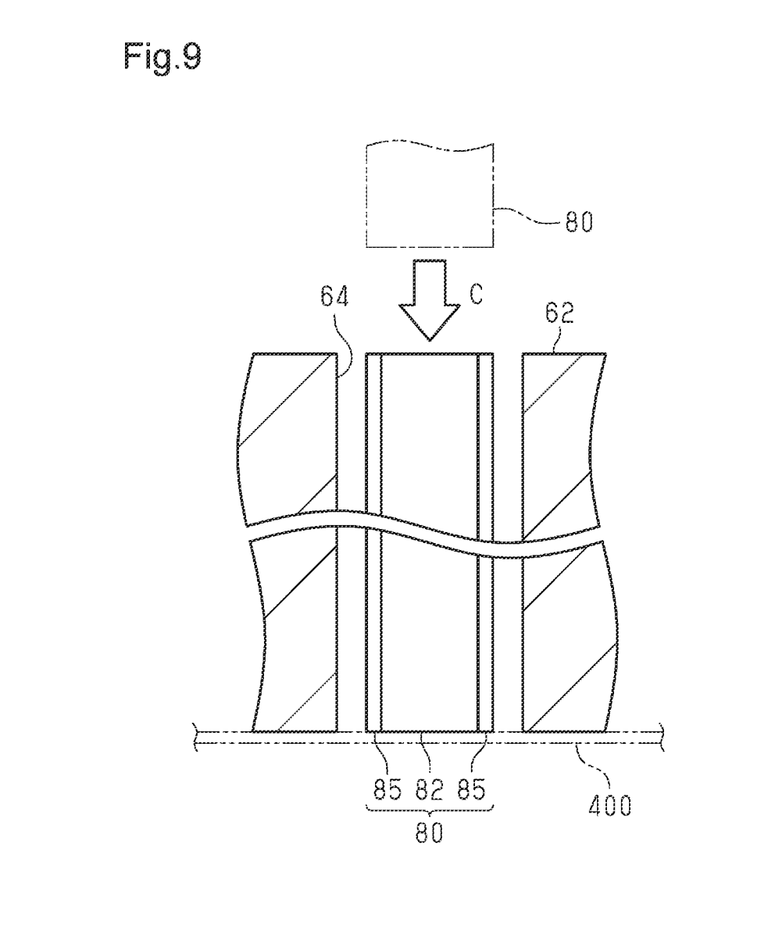
FIG. 9 is an explanatory diagram of an inserting step shown in FIG. 4.

As shown in FIG. 4, the inserting step S50 is performed after the cutting process S40. The inserting step S50 inserts the magnets 80 into the slots 64 of the rotor core 62. As shown in FIG. 9, the inserting step S50 arranges a disc-shaped support plate 400 substantially horizontally. The rotor core 62 is placed on the support plate 400. Each slot 64 has two openings at opposite ends in a direction parallel with the central axis J of the rotor core 62. The rotor core 62 is placed on the support plate 400 such that one of the openings of each slot 64 faces the support plate 400 and the other opening faces upward. As indicated by arrow C in FIG. 9, the magnets 80 are inserted into the slots 64 of the rotor core 62 on the support plate 400, for example, by a robotic arm.

When the magnets 80 are produced by the cutting step S40, the sheet pieces 85 of the magnets 80 have been compressed by being thermocompression-bonded to the magnet bodies 82 by the intermediate member producing step S20. Thus, the thickness of each magnet 80 including the sheet pieces 85 is less than the dimension of each slot 64 in the width direction in the rotor core 62. Therefore, when the magnets 80 are inserted into the slots 64 in the inserting step S50, the magnets 80 are smoothly moved into the slots 64.

<Fixing Step>

Figure 10:
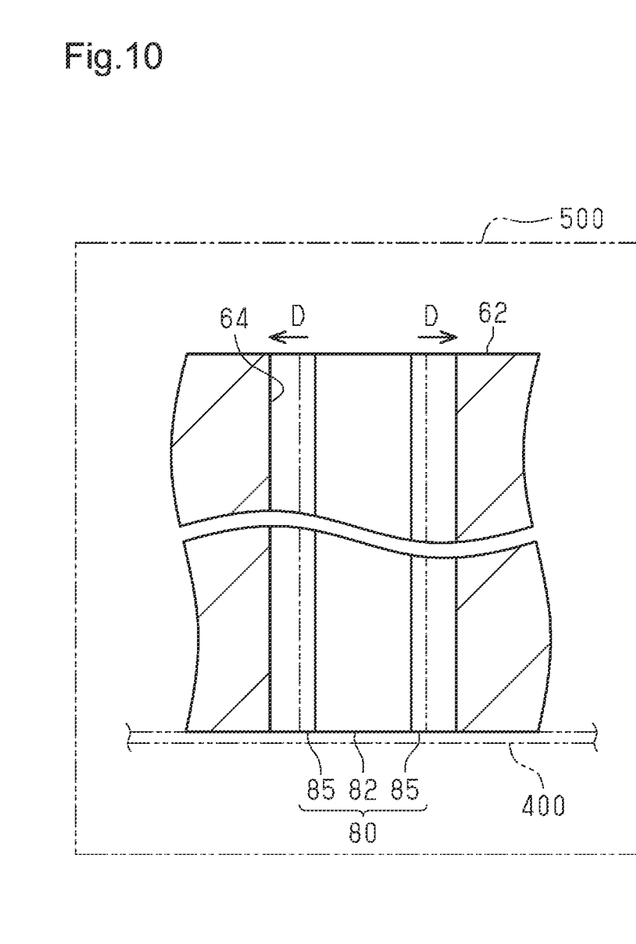
FIG. 10 is an explanatory diagram of a fixing step shown in FIG. 4.

As shown in FIG. 4, the fixing step S60 is performed after the inserting step S50. The fixing step S60 fixes the magnets 80 to the rotor core 62. As shown in FIG. 10, the fixing step S60 uses a furnace 500, the temperature of which can be regulated. Specifically, the fixing step S60 places the rotor core 62 with the magnets 80 inserted into the slots 64 in the furnace 500, together with the support plate 400. Then, the rotor core 62 is heated in the furnace 500. At this time, the temperature inside the furnace 500 is regulated to a third specified temperature Z3. The third specified temperature Z3 has been determined in advance to be higher than or equal to the glass transition temperature of polyetherimide, which forms the sheet pieces 85, and lower than the temperature at which polyetherimide evaporates. In the present embodiment, the third specified temperature Z3 is set to be equal to the first specified temperature Z1. The long-dash double-short-dash lines in FIG. 10 indicate the position of the sheet pieces 85 in a state in which the glass fiber is elastically compressed. That is, the long-dash double-short-dash lines in FIG. 10 correspond to the solid lines of the sheet pieces 85 in FIG. 9.

The rotor core 62 is heated in the furnace 500 for a third specified time L3. The third specified time L3 has been determined, for example, through experiments in advance as an amount of time required for polyetherimide to be sufficiently softened to such an extent that the glass fiber in the sheet pieces 85 restores its original state by its elasticity in a state in which the sheet pieces 85 are at the third specified temperature Z3. When the rotor core 62 is heated for the third specified time L3, the rotor core 62 is taken out from the furnace 500. Thereafter, the rotor core 62 is brought back to room temperature. The rotor 60 is thus completed.

<Operation of Embodiment>

(I) Mechanism by which Magnets are Fixed in Slots

As shown in FIG. 6, the intermediate member producing step S20 heats the first recess 201A of the first compression die 201 and the second recess 202A of the second compression die 202 to the first specified temperature Z1, which is higher than the glass transition temperature of polyetherimide. This softens the polyetherimide in the sheets 86 on the first magnet surfaces 82A of the magnet bodies 82. In this state, the intermediate member producing step S20 compresses the sheets 86. This warps the glass fiber in the sheets 86, so that the sheets 86 are in an elastically compressed state. Further, the intermediate member producing step S20 cools the first recess 201A of the first compression die 201 and the second recess 202A of the second compression die 202 to the second specified temperature Z2, which is lower than the glass transition temperature of polyetherimide, while maintaining the compressed state of the sheets 86. This joins the sheets 86 to the first magnet surfaces 82A of the magnet bodies 82 with the glass fiber being in an elastically compressed state.

For the reasons described above, the sheet pieces 85 are in an elastically compressed state in the magnets 80 when the magnets 80 are produced by the cutting step S40. The fixing step S60 reheats the sheet pieces 85 to the third specified temperature Z3, which is higher than the glass transition temperature of polyetherimide. This softens the polyetherimide in the sheet pieces 85 again. Then, the glass fiber, which has been elastically compressed, restores its original state by its elasticity. Accordingly, as indicated by arrow D in FIG. 10, the sheet pieces 85 expand from the position at which the glass fiber were compressed as indicated by the long-dash double-short-dash lines in FIG. 10. When the sheet pieces 85 expand to reach the inner surfaces of the slots 64, the friction caused by contact between the sheet pieces 85 and the inner surfaces of the slots 64 fix the magnets 80 in the slots 64.

(II) Mechanism by which Sheets are Cut

As shown in FIG. 8, the cutting step S40 holds the intermediate member 88 between the first die 303 and the second die 304. That is, the first die 303 and the second die 304 are pressed against the intermediate member 88. At this time, the sheets 86 are cut by elastic deformation of the first die 303 and the second die 304. Hereinafter, by way of example, the association between the elastic deformation of the first die 303 and the cutting of the sheets 86 will be described.

In a state in which the first die 303 is pressed against the first sheet 86A as shown in FIG. 8, the first die 303 is crushed vertically by the first base member 301 and the first magnet surfaces 82A of the magnet bodies 82. As indicated by arrow B1 in FIG. 8, each section of the first die 303 that is immediately below the first magnet surface 82A of the corresponding magnet body 82 is elastically deformed to be stretched horizontally. That is, each section of the first die 303 between the first base member 301 and the corresponding magnet body 82 is crushed by the first base member 301 and the magnet body 82 so as to be squeezed out in the lateral direction with respect to the first base member 301 and the magnet body 82. The lateral direction refers to a direction intersecting with the direction in which the first die 303 crushes the magnet bodies 82. In other words, the lateral direction refers to a direction intersecting with the direction in which the cutting device 300 is driven, which is indicated by arrow B. The lateral direction is also parallel with the first magnet surfaces 82A of the magnet bodies 82. Further, the lateral direction is parallel with the first base member 301. While being deformed in the lateral direction, the first die 303 is also deformed to enter the gaps between adjacent ones of the magnet bodies 82 as indicated by arrow B2 in FIG. 8. That is, each section of the first die 303 between the first base member 301 and the corresponding magnet body 82 is squeezed out in the lateral direction with respect to the first base member 301 and the magnet bodies 82, and is deformed to escape into the space between adjacent ones of the magnet bodies 82. The section of the first die 303 that enters the gap between adjacent ones of the magnet bodies 82 while being deformed in the lateral direction attempts to widen the region between the adjacent magnet bodies 82. That is, the adjacent magnet bodies 82 receive a force that move the magnet bodies 82 away from each other. This increases the distance between the adjacent magnet bodies 82 in some cases. As a result, a great tension is applied to a section of the first sheet 86A between the adjacent magnet bodies 82, which cuts the first sheet 86A.

The sheets 86 are also cut by the effects of the shape the magnet bodies 82. The boundaries 82S between the first magnet surfaces 82A and the second magnet surfaces 82B are angular in each magnet body 82. The boundaries 82T between the first magnet surfaces 82A and the third magnet surfaces 82C are also angular in each magnet body 82. Thus, when the first die 303 is pressed against the intermediate member 88, the first die 303 readily applies force to the boundaries 82S, 82T of the magnet bodies 82. Therefore, the first sheet 86A, which faces the first die 303, is cut at sections contacting boundaries 82S, 82T.

Thus far, the mechanism by which the sheets 86 are cut has been described using the first die 303 and the first sheet 86A as examples. The same applies to the second die 304 and the second sheet 86B.

In some sections of the intermediate member 88, the sheets 86 are cut by the force that increases the distance between the adjacent magnet bodies 82 alone. In other sections, the sheets 86 are cut by contact between the corners of the magnet bodies 82 and the sheets 86 alone. Also, in other sections, the sheets 86 are cut by a combination of these two mechanisms. That is, when a great tension is applied to each sheet 86 due to a force that increases the distance between adjacent ones of the magnet bodies 82, the sheet 86 is cut by the corners of the magnet bodies 82.

Advantages of Embodiment (1) As described in the operation section, the cutting step S40 presses the first die 303 and the second die 304 against the intermediate member 88, so that the first die 303 and the second die 304 are elastically deformed to be stretched in the lateral direction with respect to the pressing direction. The first die 303 and the second die 304 also elastically deformed to enter gaps between adjacent ones of the magnet bodies 82. As a result, adjacent ones of the magnet bodies 82 receive a force that moves the magnet bodies 82 away from each other. Accordingly, the sheets 86 are cut at positions between adjacent ones of the magnet bodies 82. The cutting of the sheets 86 occurs at multiple locations, each of which is between adjacent ones of the magnet bodies 82. The sheets 86 are thus cut efficiently.

(2) As described in the operation section, when the first die 303 and the second die 304 are pressed against the intermediate member 88, the first die 303 and the second die 304 readily apply force to the boundaries 82S between the first magnet surfaces 82A and the second magnet surfaces 82B and the boundaries 82T between the first magnet surfaces 82A and the third magnet surfaces 82C of the magnet bodies 82. Accordingly, the sheets 86 are cut at the boundaries 82S, 82T. When the sheets 86 are cut at the boundaries 82S, 82T between surfaces of the magnet bodies 82, the sheets 86 are cut at the outer edges of the magnet bodies 82. It is thus possible to produce magnets 80 that have a small amount of excess sections of the sheet pieces 85 that spread beyond the edges of the magnet bodies 82.

(3) As described in the operation section, the sheets 86, which include thermoplastic resin fiber and inorganic fiber, are thermocompression-bonded to the magnet bodies 82. Thereafter, the thermoplastic resin fiber and the inorganic fiber are reheated, so that the thermoplastic resin fiber in the sheet pieces 85 is softened again. Thus, the inorganic fiber, which has been elastically compressed, restores its original state, causing the sheet pieces 85 to expand. The fixing step S60 uses this property which allows restoration of the original state. The fixing step S60 causes the sheet pieces 85, which are thermocompression-bonded to the magnet bodies 82, to expand in the slots 64 of the rotor core 62, thereby fixing the magnets 80 to the rotor core 62. In this manner, when fixing the magnets 80 to the rotor core 62, the present embodiment thermocompression-bonds the sheets 86 to the sixteen magnet bodies 82 in the intermediate member producing step S20. The cutting step S40 thus produces the sixteen magnets 80, which include the magnet bodies 82 and the sheet pieces 85 thermocompression-bonded to the magnet bodies 82. That is, when the cutting step S40 is ended, the sheet pieces 85 are already thermocompression-bonded to the magnet bodies 82. Thus, the fixing step S60 fixes the magnets 80 to the rotor core 62 simply by heating the sixteen magnets 80 in the slots 64 of the rotor core 62. Therefore, the method of manufacturing the rotor 60 according to the present embodiment manufactures the rotor 60 highly efficiently.

The present embodiment may be modified as follows. The present embodiment and the following modifications can be combined as long as the combined modifications remain technically consistent with each other.

The configuration of the cutting device 300 used in the cutting step S40 is not limited to the example in the above-described embodiment. The cutting device 300 may have any configuration as long as it can cut the sheets 86 by holding the intermediate member 88 between the first die 303 and the second die 304. For example, a cutting device 350 shown in FIG. 11 may be employed. The cutting device 350 includes a first die 353. The upper surface of the first die 353 includes a flat surface 353P and protruding surfaces 353B, which protrude from the flat surface 353P. Specifically, the first die 353 includes protrusions 353A on the flat surface 353P. The surfaces of the protrusions 353A include the protruding surfaces 353B. The protrusions 353A are arranged in a row at equal intervals. Specifically, the protrusions 353A are provided at intervals equivalent to the dimension of the short sides of the first magnet surfaces 82A of the magnet bodies 82. The protruding end of each protrusion 353A is a flat surface. That is, each protruding surface 353B is partly flat. Likewise, a second die 354 includes protrusions 354A on a flat surface 354P. The surfaces of the protrusions 354A are protruding surfaces 354B. The protrusions 354A of the second die 354 are located at positions facing the protrusions 353A of the first die 353.

Figure 11:
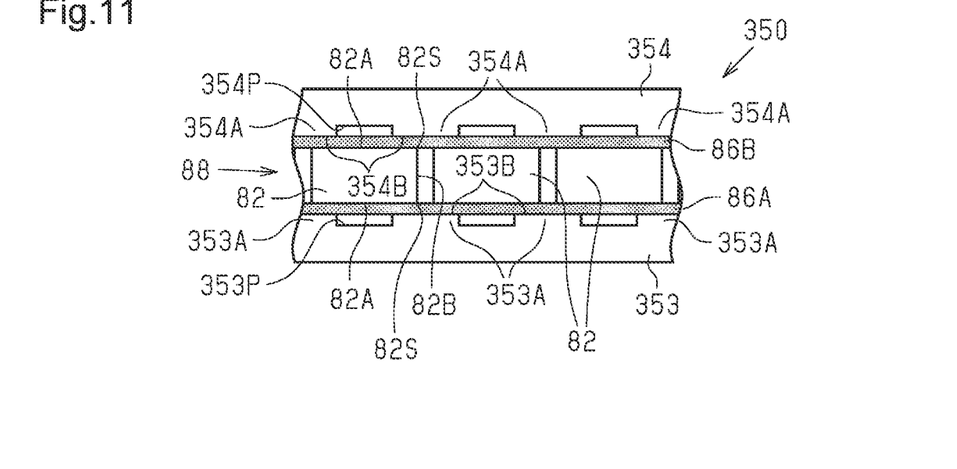
FIG. 11 is a diagram corresponding to FIG. 8, illustrating a cutting device according to a modification.

When using the cutting device 350, the intermediate member producing step S20 produces the intermediate member 88 in a state in which there is only slight clearance between adjacent ones of the magnet bodies 82. Then, the arranging step S30 arranges the intermediate member 88 such that boundaries 82S face the protruding surfaces 353B of the first die 353 with the first sheet 86A in between, the boundaries 82S being between the first magnet surfaces 82A of the magnet bodies 82, which face downward, and the second magnet surfaces 82B. When the intermediate member 88 is arranged in this manner, the boundaries 82S between the first magnet surfaces 82A of the magnet bodies 82, which face upward, and the second magnet surfaces 82B face the protruding surfaces 354B of the second die 354. The cutting step S40 is executed in this arrangement.

In a case in which the protrusions 353A are provided on the upper surface of the first die 353, pressing the first die 353 against the intermediate member 88 allows force to be easily applied to the first sheet 86A from the protruding surfaces 353B of the first die 353. Specifically, great force is applied to sections in the first sheet 86A that are held between the protruding surfaces 353B of the first die 353 and the boundaries 82S of the magnet bodies 82. The first sheet 86A is thus cut reliably in these sections. The same applies to cutting of the second sheet 86B and to the protruding surfaces 354B of the second die 354. In FIG. 11, the first base member 301 and the second base member 302 are not illustrated. As in the case of FIG. 7, the first sheet 86A and the second sheet 86B are depicted with dots in FIG. 11.

Figure 12:
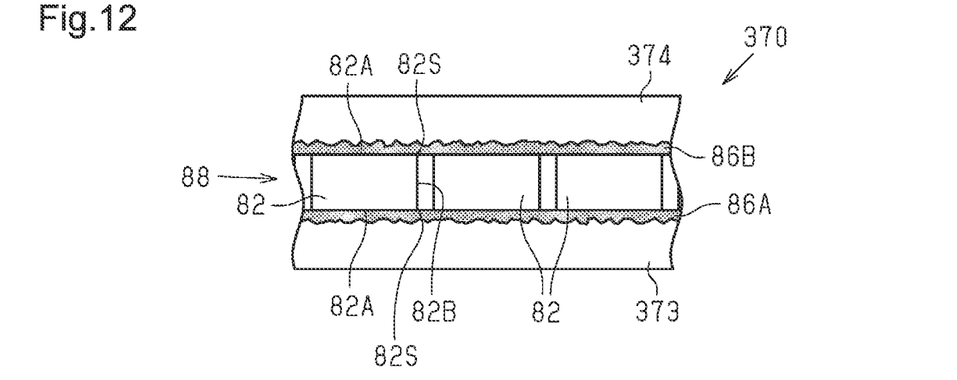
FIG. 12 is a diagram corresponding to FIG. 8, illustrating a cutting device according to a modification.

A cutting device 370 shown in FIG. 12 may be employed. The cutting device 370 includes irregularly arranged protrusions on the upper surface of a first die 373. That is, the first die 373 includes irregularly arranged continuous recesses and protrusions on the upper surface. For example, in a case in which the upper surface of the first die 303 is a flat surface as in the above-described embodiment shown in FIG. 7, the force applied to the intermediate member 88 from the upper surface of the first die 303 is uniform at any position on the upper surface of the first die 303. In contrast, in a case in which protrusions are provided irregularly on the upper surface of the first die 373 as shown in FIG. 12, the force applied to the intermediate member 88 from the upper surface of the first die 373 varies depending on the position on the upper surface of the first die 373. Further, the intermediate member 88 receives a great force locally at some positions. Due to the fact that the first die 373 receives such a great force at multiple positions, the first die 373 may be elastically deformed in an irregular manner between the first base member 301 and the magnet bodies 82. This may generate force that moves adjacent ones of the magnet bodies 82 away from each other. This allows the sheet 86 to be cut. Also, since a great force is locally applied to the boundaries 82S between the first magnet surfaces 82A of the magnet bodies 82 and the second magnet surfaces 82B, the sheet 86 can be cut at the boundaries 82S. As in the case of the first die 373, the second die 374 may include irregularly formed recesses and protrusions on the lower surface. In FIG. 12, the first base member 301 and the second base member 302 are not illustrated. As in the case of FIG. 7, the first sheet 86A and the second sheet 86B are depicted with dots in FIG. 12.

The Shore hardness of the first die 303 is not limited to the example in the above-described embodiment. If the Shore hardness of the first die 303 is great, the sheets 86 can be cut even if the force by which the first die 303 is pressed against the intermediate member 88 is small. If the force by which the first die 303 is pressed against the intermediate member 88 is small, the first die 303 is unlikely to receive load. This is advantageous in improving the durability of the first die 303. The Shore hardness can be set to an appropriate value by taking into consideration of the durability of the first die 303 and further the balance between the durability and the costs. The same applies to the Shore hardness of the second die 304. The Shore hardness of the first die 303 and the Shore hardness of the second die 304 may be different from each other.

The elastic coefficient of the first die 303 and the elastic coefficient of the second die 304 may be different from each other. The elastic coefficient of the first die 303 may be changed as long as it is lower than that of the magnet bodies 82. The same applies to the second die 304. The elastic coefficient of the second die 304 may be changed as long as it is lower than that of the magnet bodies 82.

The material of the first die 303 is not limited to the example in the above-described embodiment. The first die 303 may be made of any elastic material. The material of the first die 303 may be, for example, a thermoplastic elastomer. The same applies to the second die 304. The material of the first die 303 and the material of the second die 304 may be different from each other.

When the intermediate member 88 includes only one sheet 86 as in a modification discussed below, the second die 304 does not necessarily need to be made of an elastic material as long as the first die 303 is made of an elastic material. In this case, the arranging step S30 simply needs to cause the sheet 86 and the first die 303 to face each other.

As for the arrangement of the first die 303 and the second die 304, the positions of the first die 303 and the second die 304 may be switched vertically from the positions in the above-described embodiment. That is, the first die 303 may be located above the second die 304.

While facing each other, the first die 303 and the second die 304 may be arranged in the direction of gravitational force or arranged along a horizontal plane. For example, in a case in which the first die 303 and the second die 304 are arranged along a horizontal plane, the arranging step S30, for example, suspends the intermediate member 88 between the first die 303 and the second die 304. Then, the cutting step S40 holds the intermediate member 88 between the first die 303 and the second die 304 from opposite sides in the direction along the horizontal plane. The sheets 86 may be cut by employing this configuration.

The mechanism that drives the cutting device 300 may be changed from the example in the above-described embodiment. For example, the cutting device 300 may be driven hydraulically.

The standby time M of the cutting step S40 is not limited to five seconds, which is the example in the above-described embodiment. The standby time M may be changed as long as it is an amount of time required to complete cutting of the sheets 86.

Figure 13:
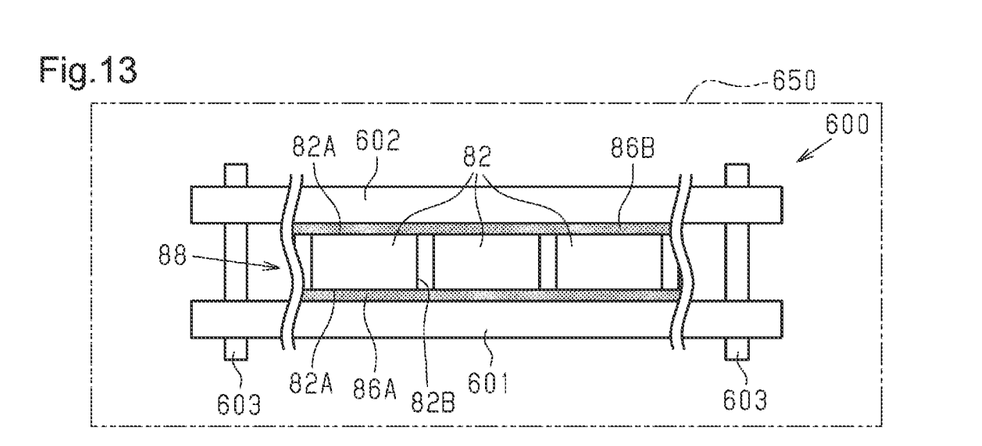
FIG. 13 is a diagram corresponding to FIG. 6, illustrating an intermediate member producing step according to a modification.

The method of producing the intermediate member 88 in the intermediate member producing step S20 is not limited to the example in the above-described embodiment. For example, a compressing jig 600 shown in FIG. 13 may be used to produce the intermediate member 88. The compressing jig 600, for example, includes a first plate 601 and a second plate 602, which are made of copper. When producing the intermediate member 88 by using the compressing jig 600, the first sheet 86A is first placed on the first plate 601. Then, the magnet bodies 82 are placed on the first sheet 86A. Thereafter, the second sheet 86B is placed over the magnet bodies 82. Then, the second plate 602 is placed on the second sheet 86B. In this manner, the magnet bodies 82 covered with the two sheets 86 are held between the first plate 601 and the second plate 602. Subsequently, the first plate 601 and the second plate 602 are fixed with bolts 603 with a specified load N acting on the two sheets 86. In this fixed state, the magnet bodies 82 and the two sheets 86 are placed in a furnace 650 together with the compressing jig 600. The temperature in the furnace 650 can be regulated. Then, the temperature in the furnace 650 is maintained at the first specified temperature Z1 for the first specified time L1. Thereafter, the temperature in the furnace 650 is maintained at the second specified temperature Z2 for the second specified time L2. Subsequently, the compressing jig 600 is taken out from the furnace 650. When the second plate 602 is moved together with the bolts 603, the completed intermediate member 88 is obtained. The intermediate member 88 may be produced in this manner. As in the case of FIG. 6, the first sheet 86A and the second sheet 86B are depicted with dots in FIG. 13.

The configuration of the intermediate member 88 is not limited to the example in the above-described embodiment. For example, the number of the magnet bodies 82 in the intermediate member 88 may be changed from sixteen, which is the number in the above-described embodiment. The number of the magnet bodies 82 in the intermediate member 88 may be greater than the number of the slots 64 in a single rotor core 62. The number of the magnet bodies 82 in the intermediate member 88 may be changed to any number greater than one.

The arrangement of the magnet bodies 82 in the intermediate member 88 is not limited to the example in the above-described embodiment. For example, the magnet bodies 82 may be arranged in two or more rows.

The intermediate member 88 may be configured to have no gaps between adjacent ones of the magnet bodies 82. When the first die 303 and the second die 304 are pressed against such an intermediate member 88, the sheets 86 are cut in correspondence with elastic deformation of the first die 303 and the second die 304. That is, when the first die 303 is pressed against the intermediate member 88, the first die 303 is crushed between the first base member 301 and the magnet bodies 82. This elastically deforms the first die 303, so that the first die 303 is stretched in the lateral direction. With such elastic deformation, the first die 303 applies force to the magnet bodies 82 so as to move adjacent ones of the magnet bodies 82 away from each other. Accordingly, the sheet 86 is cut at positions between adjacent ones of the magnet bodies 82. The second die 304 can cut the sheet 86 in the same manner.

The shape and the dimensions of the sheets 86 are not limited to the examples in the above-described embodiment. The shape and the dimensions of the sheets 86 may be adjusted to cover the magnet bodies 82 forming intermediate member 88.

The intermediate member 88 does not necessarily need to be formed by thermocompression-bonding the sheets 86 to the magnet bodies 82. For example, the intermediate member 88 may be formed by bonding the sheets 86 to the magnet bodies 82 using an adhesive or a double-sided adhesive tape. In this case, the bonding force of the adhesive or the double-sided adhesive tape does not need to be significantly great since it suffices for the cutting step S40 if the sheets 86 can be tentatively fastened to the magnet bodies 82. When such an intermediate member 88 is employed, the sheets 86 simply need to be thermocompression-bonded to the magnet bodies 82 after the cutting step S40. The intermediate member 88 may have any configuration as long as multiple magnet bodies 82 are located on the same surface of the sheet 86. In other words, the intermediate member 88 may have any configuration as long as multiple magnet bodies 82 are located on the first sheet surface 87 of the sheet 86.

The intermediate member 88 may have a single sheet 86. That is, the intermediate member 88 may be configured such that only one of the first magnet surfaces 82A of each magnet body 82 is covered with the sheet 86.

The configuration of the intermediate member manufacturing apparatus 200 is not limited to the example in the above-described embodiment. The intermediate member manufacturing apparatus 200 may have any configuration as long as it can heat and compress the sheets 86. For example, the mechanism that drives the intermediate member manufacturing apparatus 200 may be changed from the example in the above-described embodiment. For example, the intermediate member manufacturing apparatus 200 may be driven hydraulically.

The material of the first compression die 201 is not limited to the example of the above-described embodiment. For example, the first compression die 201 may be made of iron. The same applies to the second compression die 202. The material of the first compression die 201 and the material of the second compression die 202 may be different from each other.

When the intermediate member 88 includes a single sheet 86 as described above, one of the first compression die 201 and the second compression die 202 does not necessarily need to include the heater H. In this case, the unnecessary heater H may be omitted. The same applies to coolant passages W. Further, the coolant passages W may be omitted from both the first compression die 201 and the second compression die 202. In this case, the intermediate member manufacturing apparatus 200 can be cooled by being left unattended for a certain amount of time after the heaters H are stopped.

A structure other than the coolant passages W may be used as the mechanism that cools the first compression die 201. The same applies to the mechanism that cools the second compression die 202.

The first specified temperature Z1 of the intermediate member producing step S20 may be significantly higher than the glass transition temperature of the thermoplastic resin fiber.

The second specified temperature Z2 of the intermediate member producing step S20 may be significantly lower than the glass transition temperature of the thermoplastic resin fiber. The second specified temperature Z2 may be room temperature, for example.

The third specified temperature Z3 of the fixing step S60 may be different from the first specified temperature Z1 of the intermediate member producing step S20.

The method of heating the sheet pieces 85 in the fixing step S60 is not limited to the example in the above-described embodiment. For example, high frequency induction heating may be performed. That is, the rotor core 62, which accommodates the magnets 80 in the slots 64, is arranged inside the coil for high frequency induction heating. The coil is then energized to generate a magnetic field, so that the sheet pieces 85 are heated together with the rotor core 62.

The type of permanent magnets used as the magnet bodies 82 is not limited to the example in the above-described embodiment. Any type of permanent magnets may be used as the magnet bodies 82. Examples of permanent magnets used as the magnet bodies 82 include at least one of ferrite magnets, alnico magnets, samarium-cobalt magnets, praseodymium magnets, samarium-iron-nitrogen magnets, platinum magnets, or cerium cobalt magnets.

The shape of the magnet bodies 82 is not limited to the example in the above-described embodiment. For example, the boundaries between the first magnet surfaces 82A and the second magnet surfaces 82B may be chamfered. Even in this case, the first magnet surfaces 82A and the second magnet surfaces 82B are adjacent to each other with the chamfered surface in between. Also, the first magnet surfaces 82A may be curved. The magnet bodies 82 may have any shape as long as the magnet bodies 82 can be accommodated in the slots 64 of the rotor core 62.

If the shape of the magnet bodies 82 is changed from the example in the above-described embodiment, the magnet bodies 82 may lack angular sections. Even in this case, if the first die 303 and the second die 304 are elastically deformed, a force that moves adjacent ones of the magnet bodies 82 away from each other is applied to the magnet bodies 82, so that the sheets 86 are cut.

The type of thermoplastic resin fiber in the sheets 86 and the sheet pieces 85 is not limited to the example in the above-described embodiment. The thermoplastic resin fiber, for example, may be polyethersulfone or polysulfone. The rotor 60 may be heated to a high temperature during the use of the motor 50. Also, depending on the usage environment of the motor 50, the rotor 60 may be splashed with water and oil, or receive an external force. Taking these factors into consideration, the thermoplastic resin fiber preferably has at least one of a high heat resistance, a high water resistance, a high oil resistance, a high creep resistance, a high thermal shock resistance, or a high insulation property.

When the type of the thermoplastic resin fiber in the sheets 86 and the sheet pieces 85 is changed as in the above-described modification, the first specified temperature Z1 of the intermediate member producing step S20 simply needs to be changed in accordance with the glass transition temperature of the employed thermoplastic resin fiber. The first specified temperature Z1 may be any temperature that is higher than or equal to the glass transition temperature of the employed thermoplastic resin fiber, and lower than the temperature at which the employed thermoplastic resin fiber evaporates. The same applies to the third specified temperature Z3 of the fixing step S60.

As in the above-described modification, the second specified temperature Z2 simply needs to be changed in accordance with the glass transition temperature of the employed thermoplastic resin fiber. The second specified temperature Z2 may be any temperature that is lower than the glass transition temperature of the employed thermoplastic resin fiber.

The type of the inorganic fiber in the sheets 86 and the sheet pieces 85 is not limited to the example in the above-described embodiment. Examples of the inorganic fiber include at least one of rock wool, carbon fiber, alumina fiber, calcium silicate fiber, potassium titanate fiber, or ceramic fiber.

When the type of the inorganic fiber in the sheets 86 and the sheet pieces 85 is changed as in the above-described modification, the specified load N of the intermediate member producing step S20 simply needs to be changed in accordance with the employed inorganic fiber. The specified load N may be any value that is greater than or equal to the minimum load required to elastically compress the employed inorganic fiber, and less than the minimum load that breaks the employed inorganic fiber.

When the type of the thermoplastic resin fiber in the sheets 86 and the sheet pieces 85 is changed or when the type of the inorganic fiber in the sheets 86 and the sheet pieces 85 is changed, the first specified time L1 of the intermediate member producing step S20 simply needs to be changed in accordance with the combination of the thermoplastic resin fiber and the inorganic fiber. The first specified time L1 may be set to any amount of time that is required to soften the inorganic plastic fibers to an extent sufficient for the inorganic fiber in the sheets 86 to be elastically compressed in a state in which the sheets 86 are at the first specified temperature Z1. Like the first specified time L1, the second specified time L2 of the intermediate member producing step S20 and the third specified time L3 of the fixing step S60 may be changed in accordance with the combination of the thermoplastic resin fiber and the inorganic fiber.

The arrangement of the slots 64 in the rotor core 62 is not limited to the example in the above-described embodiment. The slots 64 do not necessarily need to be arranged to form the shapes of the letter V as in the above-described embodiment, but may be arranged along the circumference of the rotor core 62, for example. Any arrangement of the slots 64 may be employed as long as the magnets 80 are arranged such that the north poles and the south poles are arranged alternately in the circumferential direction of the rotor core 62.

The number of the slots 64 in the rotor core 62 is not limited to the example in the above-described embodiment. The number of the slots 64 may be changed as long as the magnetic poles are properly arranged as in the above-described modification.

If it is not crucial to achieve a high efficiency in the manufacture of the rotor 60, thermal expansion of the sheet pieces 85 does not necessarily need to be used to fix the magnets 80 to the rotor core 62. If the magnets 80 are fixed to the rotor core 62 by a method other than thermal expansion of the sheet pieces 85, the sheets 86 and the sheet pieces 85 do not necessarily include thermoplastic resin fiber or inorganic fiber. Regardless of the configuration of the sheets 86, the use of the cutting device 300 is effective in producing the magnets 80 by cutting the sheets 86 of the intermediate member 88.

The cutting device 300 may be used to produce multiple magnets that are attached to a device other than the rotor 60.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method of manufacturing magnets, the method comprising:
   producing an intermediate member that includes a sheet and magnet bodies, the sheet including a first sheet surface and a second sheet surface on a side opposite to first sheet surface, and the magnet bodies being located on the first sheet surface;
   arranging the intermediate member between a first die and a second die, the first die being made of an elastic material having an elastic coefficient smaller than an elastic coefficient of the magnet bodies, the second die facing the first die, and the intermediate member being arranged between the first die and the second die such that the second sheet surface of the sheet faces the first die; and
   cutting the sheet at positions between adjacent ones of the magnet bodies by holding the intermediate member between the first die and the second die.

2. The method of manufacturing the magnets according to claim 1, wherein
   the magnet bodies each include a flat first magnet surface and a flat second magnet surface, the second magnet surface being adjacent to the first magnet surface, and
   the producing the intermediate member includes arranging the magnet bodies on the first sheet surface of the sheet such that the first magnet surface contacts the sheet.

3. The method of manufacturing the magnets according to claim 2, wherein
   a surface of the first die that faces the sheet includes a flat surface and a protruding surface that protrudes from the flat surface, and
   the arranging the intermediate member between the first die and the second die includes arranging the intermediate member such that a boundary between the first magnet surface and the second magnet surface of each magnet body and the protruding surface face each other with the sheet in between.

4. The method of manufacturing the magnets according to claim 1, wherein
   the sheet includes a thermoplastic resin fiber and an inorganic fiber, and
   the producing the intermediate member includes compressing the sheet while heating the sheet to a temperature higher than or equal to a glass transition temperature of the thermoplastic resin fiber, thereby thermocompression-bonding the sheet to the magnet bodies with the inorganic fiber being elastically compressed.

5. A method of manufacturing a rotor, the method comprising:
   producing an intermediate member, the intermediate member including a sheet and magnet bodies, the sheet including a first sheet surface and a second sheet surface on a side opposite to first sheet surface, the sheet including a thermoplastic resin fiber and an inorganic fiber, the producing the intermediate member including compressing, in a state in which the magnet bodies are located on the first sheet surface of the sheet, the sheet while heating the sheet to a temperature higher than or equal to a glass transition temperature of the thermoplastic resin fiber, thereby thermocompression-bonding the sheet to the magnet bodies with the inorganic fiber being elastically compressed;
   arranging the intermediate member between a first die and a second die, the first die being made of an elastic material having an elastic coefficient smaller than an elastic coefficient of the magnet bodies, the second die facing the first die, and the intermediate member being arranged between the first die and the second die such that the second sheet surface of the sheet faces the first die;
   cutting the sheet at positions between adjacent ones of the magnet bodies by holding the intermediate member between the first die and the second die in order to produce magnets, the magnets each including one of the magnet bodies and a sheet piece that is generated by cutting the sheet and covers one of the magnet bodies; and
   fixing the magnets to the rotor core by heating the magnets to a temperature higher than or equal to the glass transition temperature in a state in which the magnets are arranged inside slots in the rotor core, wherein the heating the magnets to the temperature higher than or equal to the glass transition temperature causes the inorganic fiber to restore its original state by its elasticity so that the magnets are fixed to the rotor core.

* * * * *